United States Patent
Lundin

(10) Patent No.: US 7,733,893 B2
(45) Date of Patent: Jun. 8, 2010

(54) METHOD AND RECEIVER FOR DETERMINING A JITTER BUFFER LEVEL

(75) Inventor: Henrik Fahlberg Lundin, Sollentuna (SE)

(73) Assignees: Global IP Solutions (GIPS) AB, Stockholm (SE); Global IP Solutions, Inc., San Francisco, CA (US)

( * ) Notice: Subject to any disclaimer, the term of this patent is extended or adjusted under 35 U.S.C. 154(b) by 332 days.

(21) Appl. No.: 11/822,025

(22) Filed: Jun. 29, 2007

(65) Prior Publication Data

US 2009/0003369 A1 Jan. 1, 2009

(51) Int. Cl.
H04L 12/28 (2006.01)

(52) U.S. Cl. ........................ 370/412; 370/516
(58) Field of Classification Search ........................ None
See application file for complete search history.

(56) References Cited

U.S. PATENT DOCUMENTS

| | | | |
|---|---|---|---|
| 5,337,264 A * | 8/1994 | Levien | 708/300 |
| 5,623,483 A | 4/1997 | Agrawal et al. | |
| 6,072,809 A | 6/2000 | Agrawal et al. | |
| 6,259,677 B1 | 7/2001 | Jain | |
| 7,110,422 B1 | 9/2006 | Choudhury et al. | |
| 7,359,324 B1 * | 4/2008 | Ouellette et al. | 370/230 |
| 2001/0019537 A1 | 9/2001 | Itai | |
| 2004/0008628 A1 | 1/2004 | Banerjee | |
| 2004/0139215 A1 * | 7/2004 | Lanphear | 709/232 |
| 2005/0207437 A1 * | 9/2005 | Spitzer | 370/412 |

FOREIGN PATENT DOCUMENTS

WO   WO-01/88763 A1   11/2001

* cited by examiner

Primary Examiner—Chirag G Shah
Assistant Examiner—Minh-Trang Nguyen
(74) Attorney, Agent, or Firm—Birch, Stewart, Kolasch & Birch, LLP

(57) ABSTRACT

The invention relates to a method and a receiver having control logic means for determining a target packet level of a jitter buffer adapted to receive packets with digitized signal samples, which packets are subject to delay jitter, from a packet data network. According to the invention, the jitter buffer is made adaptive to current network conditions, i.e., the nature and magnitude of the jitter observed by the receiver, by collecting statistical measures that describe these conditions. The target buffer level is determined with regard to the effect of packet losses in terms of duration of the discontinued playback of the true signal. This effect is derived from statistical measures of the network conditions as perceived by the receiving side and as reflected by a probability mass function which is continuously updated with packet inter-arrival times. The target buffer level is the result of minimization of a cost function which weights the internal buffer delay and an expected length of buffer underflow.

25 Claims, 3 Drawing Sheets

METHOD AND RECEIVER FOR DETERMINING A JITTER BUFFER LEVEL

TECHNICAL FIELD OF THE INVENTION

The present invention generally relates to reception of data packets with digitized signal samples from a packet data network, and more specifically to determining a target packet level of a jitter buffer adapted to receive packets with delay jitter from the network.

BACKGROUND OF THE INVENTION

In packet switched networks, such as the Internet, data packets transferred by the network are subject to varying delays due to network load when transferring a packet, network path for a transferred packet, and other network conditions. Thus, data packets that are produced by a transmitter at a constant rate arrive at a receiver with variable delays. The varying delay of a data packet is mainly due to the delay inflicted by the packet network and is often referred to as jitter. The severity of the jitter can vary significantly depending on network type and current conditions; the variance of the packet delay can change with several orders of magnitude from one network type to another.

In order to reproduce an audio stream that is true to the original, a decoder must be provided with data packets at the same constant rate with which they were sent. Therefore, a device called a jitter buffer is commonly introduced in the receiver. The jitter buffer must de-jitter the incoming stream of packets and provide a constant flow of data to the decoder. This is done by holding the packets in a buffer, thus introducing a delay at the receiver, so that future packets that are subject to larger delays will have arrived before their respective time-of-use. In other words, packets are needed in the jitter buffer to prevent the buffer from underflowing, or at least minimizing the time during which the buffer is in a state of underflow. A long delay of a packet may not only result in that the buffer becomes empty, but also that the buffer may be empty for an unacceptable long time. If the buffer becomes empty, continued playback of the received signal is no longer possible and the delayed packet will be treated as a lost packet. However, a high buffer level will introduce a long delay at the receiver which is detrimental in itself for two-way human communication.

There is an inevitable trade-off in jitter buffers between buffer delay on the one hand and packet losses due to late arrivals on the other. Aiming for a low buffer level, and thus a short delay, results in a larger portion of packets being discarded since they will arrive too late for continuous playback, while a high buffer level and a long delay will be very annoying for two-way human communication.

In the prior art, attempts are often made to estimate and control an end-to-end delay, i.e. the total delay from the sound source, e.g. a microphone, to the destination, e.g. a loudspeaker. This total delay is hard to estimate and requires synchronized clocks on transmitting and receiving ends. In addition to requiring synchronized clocks, this solution suffers from the problem of sample clock drift.

The present invention addresses the problem of how to determine a jitter buffer level which provides a suitable trade-off between buffer delay and packet losses.

SUMMARY OF THE INVENTION

An object of the present invention is to determine a jitter buffer level which provides a suitable trade-off between buffer delay and packet losses. This object is achieved by a method as defined in independent claim 1 and a receiver as defined in independent claim 14.

The basic idea of the invention is to make a jitter buffer adaptive to current network conditions, i.e., the nature and magnitude of the jitter observed by the receiver, by collecting statistical measures that describe these conditions.

According to the invention, a probability mass function is continuously updated with inter-arrival times between received packets. With the updated probability mass function, an expected duration of an empty jitter buffer is defined.

Thus, a desired buffer level is not determined with regard to the probability of packet losses as such, but with regard to the effect of packet losses in terms of duration of the discontinued playback of the true signal. This effect is derived from statistical measures of the current and recent network conditions as perceived by the receiving side. The current and recent network conditions are reflected by the updated probability mass function. Using the probability mass function, the risk of "underflowing" the buffer can be derived, i.e. the probability that all packets at a certain buffer level will be decoded before the next packet arrives in the buffer. Moreover, for a certain buffer level, the expected duration of an empty buffer is given by the probability mass function. This "outage time" is approximately equal to the amount of synthetic data, or packet loss concealment data, that must be generated and played when the buffer becomes empty. Thus, an advantage of the invention is that a suitable buffer level is determined based on continuous statistical measures of the network conditions.

The invention minimizes a cost function, which function includes a jitter buffer delay and an expected duration of an empty buffer. By applying a weighting factor to the cost function so as to weight the jitter buffer delay in relation to the expected duration of an empty buffer, the invention may consider the type of traffic carried by the data packets when determining the desired buffer level. This is advantageous since different kind of data traffic may have different requirements with regard to the trade-off between delay caused by the buffer and duration of any discontinued playback of data.

Preferably, the actual current buffer level is compared with the determined suitable, or target, buffer level. If there is a difference, signaling is made that the length of the decoded signal sample information should be modified, i.e. lengthened or shortened. Thus, the current buffer level is indirectly controlled in the direction of the determined target buffer level.

Further features of the invention, as well as advantages thereof, will become more readily apparent from the following detailed description. As is understood, various modifications, alterations and different combinations of features coming within the scope of the invention as defined by the appended claims will become apparent to those skilled in the art when studying the general teaching set forth herein and the following detailed description.

BRIEF DESCRIPTION OF THE DRAWINGS

Exemplifying embodiments of the present invention will be described in greater detail with reference to the accompanying drawings, in which.

DETAILED DESCRIPTION OF THE INVENTION

Figure 1:
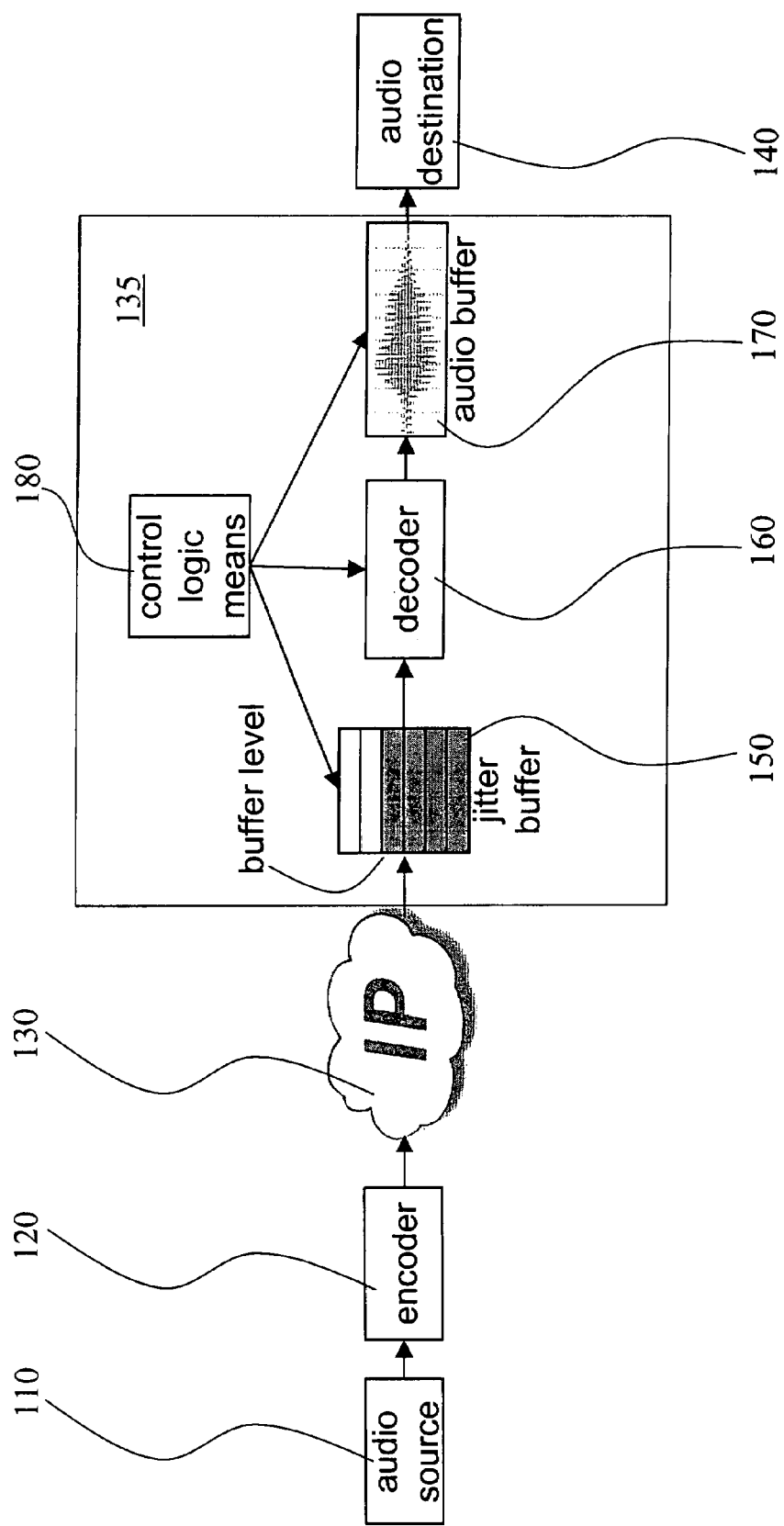
FIG. 1 schematically shows an exemplified system in which an embodiment of the inventive receiver is included and configured to operate.

With reference to FIG. 1, an exemplified system is disclosed in which an embodiment of the inventive receiver is included and configured to operate. The transmitting end includes an audio source 110 and an encoder 120 for encoding and packetizing the audio for transmission as packet data over a packet data network 130, here indicated as an Internet Protocol network. The receiving end includes a receiver 135 and an audio destination 140. The receiver 135 includes a jitter buffer 150, a decoder 160, an audio buffer 170 and control logic means 180. The control logic means 180 exchange signaling information with the jitter buffer and is also responsible for signaling to the decoder 160 and the audio buffer 170. The present invention is concerned with the jitter buffer 150 and the control logic means 180 of the receiver 135. The decoder 160 is at least in part controlled by the control logic means, as will be described below. However, the decoder 160 itself and its operations does not form part of the present invention, but is described in EP 1 243 090.

The control logic means 180 are implemented by suitable state of the art hardware circuitry, including processing circuitry and interfacing circuitry, adapted to execute program instructions stored in a non-transitory computer readable medium such as a memory of the receiver 135 for causing the control logic means to operate in accordance with the present invention. The design of these program instructions will be appreciated by a person skilled in the art of programming after having studied the present invention disclosure.

With reference to the flow chart in FIG. 2, the operation of the receiver 135 in FIG. 1, and in particular the control logic means 180, in accordance with the present invention will now be described.

In step 200 the receiver 135 at the receiving end receives data packets with digitized signal samples from the packet data network 130. Received packets are inserted in the jitter buffer 150. In step 210 the control logic means 180 logs the arrival time of a received packet in order to also log, in step 220, a packet inter-arrival time defined as the time between receipt of the current packet and the previously packet. Alternatively, not every packet's arrival time is logged, but the inter-arrival time between two consecutive packets are logged with a predetermined regular interval with regard to two occurring consecutive packets.

Continuing to step 230, the packet arrival statistics are updated by the control logic means 180. In accordance with above, the statistics may be updated for each received packet or at regular intervals. The time elapsed between two packet arrivals is of key interest and will be used in the forthcoming derivations. Let the time between the arrivals of the k:th and k+1:th incoming packets be $\tau_k \geq 0$. Assume that $\tau_k$ is a stochastic variable with some PDF $f_\tau(t)$, for all k. All times are here normalized, so that a packet carries speech information with duration 1, and the nominal packet inter-arrival time is also 1. Also define $p_\tau(m)$ as the probability of a packet inter-arrival time in the interval $m \leq \tau \leq m+1$, i.e., $$p_\tau(m) = Pr\{m \leq \tau < m+1\} = \int_m^{m+1} f_\tau(t)dt$$

The function $p_\tau(m)$ represents the probability mass function (PMF) for the inter-arrival time rounded down. This PMF is continuously updated by the control logic means 180 in order to reflect packet inter-arrival times. An estimate of this PMF $p_\tau(m)$ for m=0, 1, ..., M can be derived in accordance with the following.

Let m denote the integer number of packet times that has elapsed since the last packet was received, wherein a packet time is the duration of audio produced from data carried by a packet. (For example, if the packet time is 20 ms and the last packet arrived 50 ms ago, then m=2, since two entire packet times have elapsed.)

The inter-arrival time statistics are stored in a vector p=[p(0) p(1) ... p(M)] with M+1 elements. The first element p(0) represents the probability of observing a packet inter-arrival time larger than or equal to 0 but smaller than 1, p(1) represents inter-arrival times between 1 and 2, and so on. The last element, p(M), represents the probability of observing an inter-arrival time larger than or equal to M. All times are given as packet times. Upon observing a given inter-arrival time, the corresponding element in the vector p is increased towards 1, while the remaining elements are decreased. The increasing and decreasing is governed by a forgetting factor μ, which is a design variable. The following steps constitute the statistics update method:

1. When receiving a new packet, count the number of packet times elapsed since the last packet was received. Denote this number m.
2. Apply upper limit M on the measured time: if m>M, let m=M.
3. Increase the statistics vector element corresponding to the currently measured time: let the m:th element p(m) be updated to μp(m)+(1−μ).
4. Decrease the remaining statistics vector elements: multiply each element (except p(m)) with the factor μ.

The vector p will be a constantly evolving estimate of the packet inter-arrival time probability density function (PDF), and should by construction sum up to 1. The PDF estimate indicates what the network conditions are.

The purpose of estimating the inter-arrival time statistics is to calculate a buffer level suitable for the current network conditions. If the network conditions are fair, the probability of observing very long periods between arriving packets is small, and a low buffer level is appropriate. If, on the contrary, the same probability is high, the number of packets in the buffer should be kept higher in order to be prepared for long periods without incoming packets.

Determining a suitable buffer level is a trade-off between low internal delay at the receiver and robustness against network jitter, as these two requirements are contradictory. The internal delay is simply the buffer level B. A measure of the robustness against network jitter is the duration of a buffer underflow, i.e., the expected duration of an empty jitter buffer given buffer level B. In this context, B is any arbitrary buffer level.

In step 240 an expected duration of an empty jitter buffer is defined by the control logic means 180. Assuming an arbitrary buffer level B, i.e., B packets are in the jitter buffer, an underflow occurs if we have decoded and used all B packets before the next packet arrives. In other words, if the inter-arrival time between the last received packet and the next packet is larger than $B \cdot T_{frame}$ seconds, where $T_{frame}$ is the length of the audio data carried in each packet, a buffer underflow occurs. The probability of an underflow, given that we have B packets in the buffer, can be expressed in the PDF $f_\tau(t)$ as $$Pr\{\text{underflow} | B\} = \int_B^\infty f_\tau(t)dt$$

Similarly, the expected length of an underflow, i.e., roughly the length of the concealment data that must be produced, can be written as $$E[\text{length(underflow)} | B] = \int_B^\infty (t-B)f_\tau(t)dt$$

Thus, the above equation defines the expected duration of an empty jitter buffer given a buffer level B.

As discussed above, determining a suitable buffer level is a trade-off between low internal delay at the receiver and robustness against network jitter in terms of a low expected duration of an empty jitter buffer. The combination of these two quantities forms the basis of an optimization problem that needs to be solved.

Therefore, in step 250, the control logic means 180 is configured to define and make use of a cost function in which these two quantities are weighted and combined. Typically, the cost function corresponds to a function, e.g., a sum, of the expected duration of an empty jitter buffer and a jitter buffer delay at buffer level B.

$$\eta(B) = C \cdot B + E[\text{length(underflow)} | B] = C \cdot B + \int_B^\infty (t-B)f_\tau(t)dt$$

The parameter C is a weighting factor which sets the relative importance of the two quantities. A large C will punish a large internal buffer delay harder while a small C will punish severe buffer underflows. The goal is to find the B that minimizes the cost function.

In step 260 the control logic means 180 minimizes the cost function with regard to buffer level B to thereby derive a target buffer level. Analytically this is performed in accordance with the following.

Deriving the target buffer level starts with differentiating $\eta(B)$ with respect to B and equating the result to zero:

$$\frac{d}{dB}\eta(B) = C - \int_B^\infty f_\tau(t)dt \equiv 0 \Leftrightarrow \int_{B^*}^\infty f_\tau(t)dt = C.$$

That is, the value $B^*$ for which the integral of $f_\tau(t)$ from $B^*$ to infinity is equal to C is an extreme value of the cost function $\eta(B)$. The optimum is unique and well defined for all $0<C<1$, since $f_\tau(t) \geq 0$ and integrates to 1. Furthermore, differentiating $\eta(B)$ a second time yields a positive result, indicating that $\eta(B)$ is a convex function with one unique minimum.

The above result is given using the continuous function $f_\tau(t)$, while the available statistics in the implemented method is the discretized version $p_\tau(m)$. Hence, we must re-write the above optimality criterion in terms of the discretized statistics. First, we use the fact that $$\int_0^\infty f_\tau(t)dt = 1 \Leftrightarrow \int_{B^*}^\infty f_\tau(t)dt = 1 - \int_0^{B^*} f_\tau(t)dt$$

to write the optimality criterion as $$1 - \int_0^{B^*} f_\tau(t)dt = C.$$

Now, since $$p_\tau(m) = Pr\{m \leq \tau < m+1\} = \int_m^{m+1} f_\tau(t)dt,$$

the integral of $f_\tau(t)$ from 0 to $B^*$ can be expressed as $$\int_0^{B^*} f_\tau(t)dt = \sum_{m=0}^{B^*-1} p_\tau(m),$$

but only when $B^*$ is an integer value. For non-integer values it holds that $$\sum_{m=0}^{B^*-1} p_\tau(m) < \int_0^{B^*} f_\tau(t)dt < \sum_{m=0}^{B^*} p_\tau(m)$$

Thus, we cannot expect to find a $B^*$ for which 1 minus the sum is exactly C, as stipulated in the optimality criterion. Therefore, we define that the target buffer level is the smallest B such that 1 minus the sum of $p_\tau(0), p_\tau(1), \ldots, p_\tau(B)$ is smaller than or equal to C. This can be expressed as $$B^* = \underset{B}{\operatorname{argmin}} \left\{ B: 1 - \sum_{m=0}^{B} p_\tau(m) \leq C \right\}.$$

(The formula could be equivalently formulated as a sum going backwards from the last element $p_\tau(M)$ towards the first element.)

Figure 2:
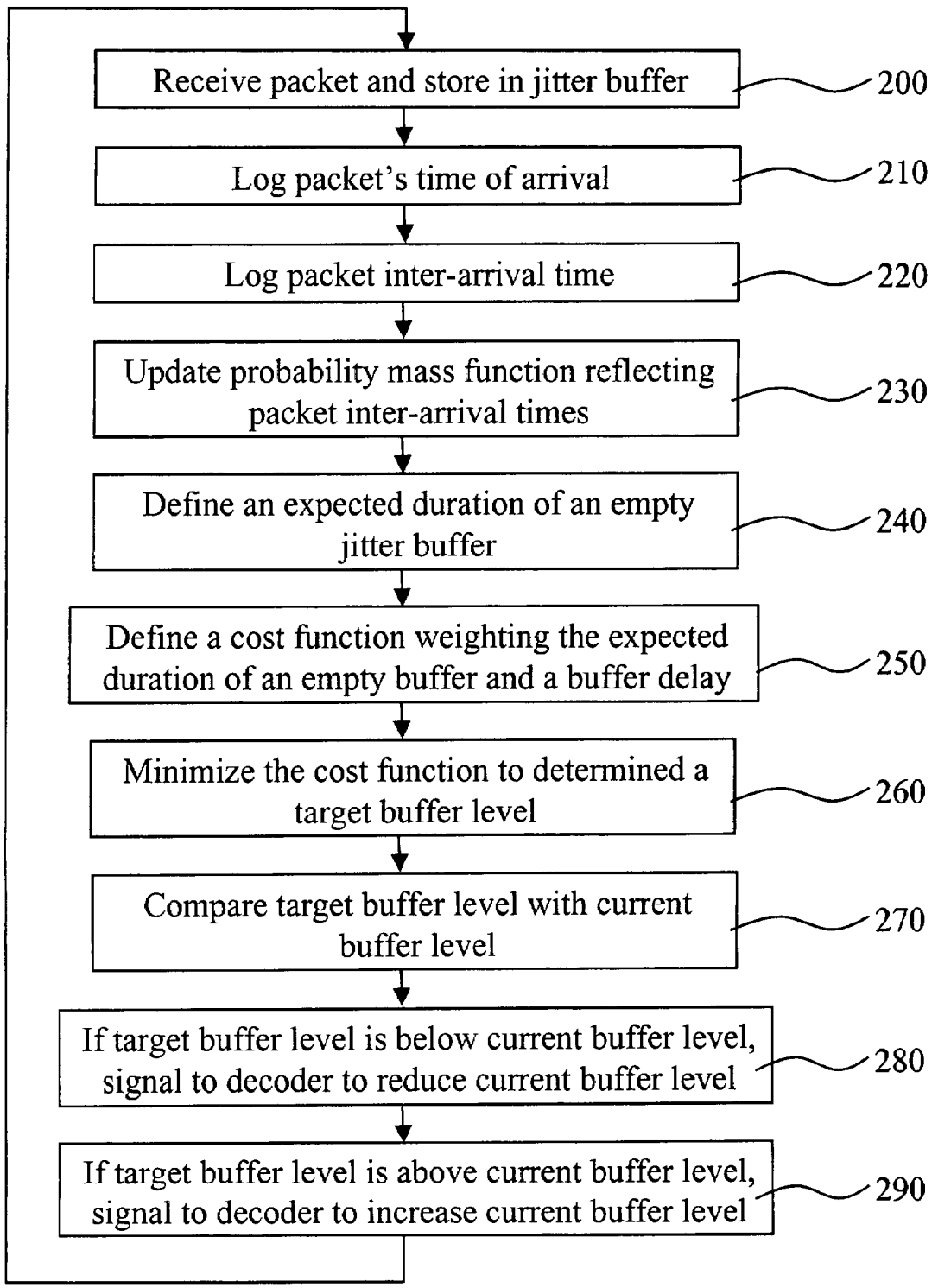
FIG. 2 is a flow chart with the operation of the control logic means of the receiver shown in FIG. 1 in accordance with an embodiment of the invention.

Thus, step 260 in FIG. 2 concerns solving the above last expression to derive $B^*$. One way to implement step 260 is by the following calculation steps 5-8 (being subsequent to steps 1-4 of the statistics update method described above). In the below steps, C denotes the weighting factor.
  5. Set a variable S to 1.
  6. Initialize a variable B to 0.
  7. Subtract the statistics vector element p(B) from S: S:=S−p(B)
  8. While S>C and B<M, increase B with one and return to step 7. Otherwise, use the value of B as the target buffer level $B^*$.

According to an advantageous embodiment, the control logic means in step 270 compare the target buffer level with a current buffer level of the jitter buffer 150. According to one embodiment, the target buffer level B* is compared with a filtered version $B_f$ of the current buffer level, rather than with the instantaneous buffer level B. This is done because the instantaneous buffer level has an intrinsic variation that it is preferred not to respond to immediately.

The current buffer level is influenced by three processes:
Packets coming in to the buffer from the network;
Packets taken out of the buffer for decoding and playout;
Buffer level modifications because of active decisions to reduce or increase the buffer level (these decisions are further discussed below).

The first two processes are considered to be of a stochastic nature, and should preferably be smoothed. The last process consists of deliberate and known buffer level modifications, and these should preferably influence the filtered buffer level immediately, without filtering.

Figure 3:
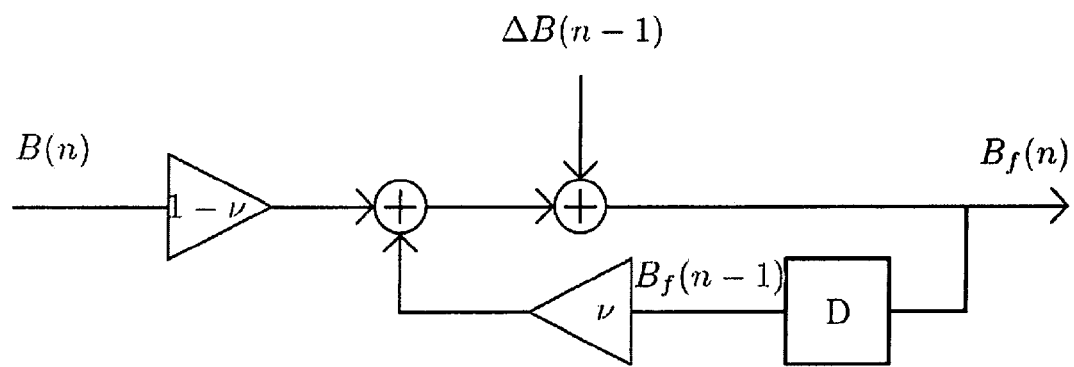
FIG. 3 shows a filter for filtering a current buffer level of the jitter buffer in FIG. 1 in accordance with an embodiment of the invention.

The smoothing is performed by a buffer level low pass filter implemented by the control logic means 180, e.g. a filter as depicted in the FIG. 3. According to an embodiment of the filter, use is made of an exponential window in the form of an IIR (infinite impulse response) filter with exponentially decaying impulse response. In the FIG. 3, B(n) is the current buffer level at time n as reported by the jitter buffer 150, $B_f(n)$ is the filtered buffer level at time n, D is a one-step delay block, ΔB(n−1) is the active buffer level modifications done since the last filter update (positive for level increase and negative for level decrease). The factor ν is the filter coefficient, determining the response of the filter.

The filter coefficient ν is made adaptive in this exemplary implementation, motivated by the following argument. In a network scenario with large variance in packet inter-arrival times, the natural fluctuations in the instantaneous buffer level are larger, and a larger ν is desired in order to increase noise resistance. When the network conditions are better, a smaller ν can be applied to improve response time. The optimal buffer level B* is an indicator of the current network conditions: a larger B* implies larger variance in inter-arrival times, and should result in a larger filter coefficient ν, and vice versa.

The filter process is performed by the control logic means 180 each time audio is played out and is summarized in the following steps 9-14 (being subsequent to the calculation steps 5-8 described above):

9. Calculate filter coefficient ν based on optimal buffer level B*:

$$v = \begin{cases} 250/256, & B^* = 0; \\ 251/256, & B^* = 1; \\ 252/256, & 2 \le B^* \le 3; \\ 253/256, & 4 \le B^* \le 7; \\ 254/256, & B^* \ge 8. \end{cases}$$

10. Measure the current number of packets B in the jitter buffer (possibly a fraction of packets). Multiply this level with 1−ν.
11. Add to this product the filtered buffer level from the previous filter update multiplied with the filter coefficient ν.
12 Add the amount of data (possibly a fraction of packets) inserted into the jitter buffer through active jitter buffer expansion to the above sum.
13. Subtract the amount of data (possibly a fraction of packets) removed from the jitter buffer through active jitter buffer reduction from the above sum.
14. The result is the new filtered buffer level.

Thus, after calculating the target buffer level, and possibly the filtered buffer level, the control logic means 180 compare the target buffer level and the current, or current filtered, buffer level to make a decision regarding any signaling that the current buffer level should be modified in the direction of the target buffer level. The comparison and resulting signaling is quite straightforward and is described with the subsequent steps 15 and 16:

15. If the (filtered) current buffer level is sufficiently larger than the target buffer level, then signal that data in the buffer should be reduced. Preferably, signaling that data in the buffer should be reduced is made if $B_f > a \cdot B^*$, where a is a parameter larger than or equal to 1.
16. If the (filtered) current buffer level is sufficiently smaller than the target buffer level, then signal that data in the buffer should be increased. Preferably, signaling that data in the buffer should be increased is made if $B_f < b \cdot B^*$, where b is a parameter smaller than or equal to 1.

The parameters a and b define a tolerance window around the target buffer level B*. If the current level is within this window, no buffer level adjustment, i.e. no signaling, is necessary. The signaling that data in the buffer should be reduced or increased is made from the control logic means 180 to the decoder 160 or to the audio buffer 170. In response to the signaling, the decoder 160 or the audio buffer 170 will modify the length of decoded signal sample information. This will result in a change of packet demand by the decoder 160 from the jitter buffer 150, i.e. it will increase or reduce the frequency with which packets are read from the jitter buffer 150, thereby reducing or increasing the buffer level. The actual implementation of how to reduce or increase the buffer level is, however, beyond the scope of this invention. For a detailed description of such an implementation, reference is made to EP 1 243 090.

The invention claimed is:

1. A method of determining a target buffer level in a jitter-buffer in response to current network conditions of a packet data network, the jitter-buffer receiving data packets with digitized signal samples from the packet data network, the method including performing, at regular intervals, the steps of:

logging, for a most recent received packet, a packet inter-arrival time defined as a time elapsed since a previous packet was received;
updating, in response to the logging step, a probability mass function reflecting packet inter-arrival times;
using the updated probability mass function by a receiver having a control logic means to define an expected duration of an empty jitter buffer for an arbitrary buffer level;
providing a cost function as a function of the expected duration of an empty buffer at the arbitrary buffer level and a jitter buffer delay at the same arbitrary buffer level, wherein a weighting factor is applied to the jitter buffer delay; and
determining the target buffer level as the jitter buffer level which minimizes the cost function.

2. The method as claimed in claim 1, wherein the cost function is defined as a sum of the weighted jitter buffer delay and the expected duration clan empty jitter buffer.

3. The method as claimed in claim 1, including:
comparing a current buffer level with the target buffer level; and
if the comparing step results in a difference between the two levels, signaling that a length of decoded signal sample information should be modified, wherein the signaling indirectly controls the current buffer level in the direction of the target buffer level by influencing data packet demand made to the buffer.

4. The method as claimed in claim 1, wherein the signaling is performed provided that the difference between the current buffer level and the target buffer level is larger that a predetermined tolerance window.

5. The method as claimed in claim 1, wherein the steps of the method are performed for each received packet.

6. The method as claimed in claim 3, including low-pass filtering the current buffer level when performing said comparing step.

7. The method as claimed in claim 6, wherein the low-pass filtering includes filtering with an infinite impulse response filter having an exponentially decaying impulse response.

8. The method as claimed in claim 1, wherein the jitter buffer delay and the expected duration of an empty buffer is given equal weight in said cost function.

9. The method as claimed in claim 1, wherein the jitter buffer delay is given more weight than the expected duration of an empty buffer in said cost function.

10. The method of claim 8, wherein the data packets with digitized signal samples include samples of a voice signal.

11. The method as claimed in claim 1, wherein the expected duration of an empty buffer is given more weight than the jitter buffer delay in said cost function.

12. The method of claim 8, wherein the data packets with digitized signal samples include samples of a radio signal.

13. A non-transitory computer readable medium having computer executable instructions for carrying out each of the steps of the method as claimed in claim 1 when run on a processing unit.

14. A receiver for receiving data packets with digitized signal samples from a packet data network, the receiver including:
 a jitter-buffer for storing the received data packets, wherein a buffer level indicates the amount of stored data packets; and
 control logic means for, at regular intervals, determining a target buffer level in the jitter-buffer in response to current network conditions of the packet data network, the control logic means further:
 logging, for a most recent received packet, a packet inter-arrival time defined as a time elapsed since a previous packet was received;
 updating, in response to the logging step, a probability mass function reflecting packet inter-arrival times;
 using the updated probability mass function to define an expected duration of an empty jitter buffer for an arbitrary buffer level;
 providing a cost function as a function of the expected duration of an empty buffer at the arbitrary buffer level and a jitter buffer delay at the same arbitrary buffer level, wherein a weighting factor is applied to the jitter buffer delay; and
 determining the target buffer level as the jitter buffer level which minimizes the cost function.

15. The receiver as claimed in claim 14, wherein the cost function is defined as a sum of the weighted jitter buffer delay and the expected duration of an empty jitter buffer.

16. The receiver as claimed in claim 14, the control logic means being further updated for:
 comparing the current buffer level with the target buffer level; and
 if said comparing results in a difference between the two levels, signaling that a length of decoded signal sample information should be modified, wherein the signaling indirectly controls the current buffer level in the direction of the target buffer level by influencing data packet demand made to the buffer.

17. The receiver as claimed in claim 14, wherein the signaling is performed only if that the difference between the current buffer level and the target buffer level is larger than a predetermined tolerance window.

18. The receiver as claimed in claim 14, wherein the control logic means is adapted to perform its operation for each received packet.

19. The receiver as claimed in claim 14, the control logic means being further adapted for low-pass filtering the current buffer level when performing the comparing operation.

20. The receiver as claimed in claim 19, wherein the low-pass filtering includes filtering with an infinite impulse response tilter having an exponentially decaying impulse response.

21. The receiver as claimed in claim 14, wherein the jitter buffer delay and the expected duration of an empty buffer is given equal weight in said cost function.

22. The receiver as claimed in claim 4, wherein the jitter buffer delay is given more weight than the expected duration of an empty buffer in said cost function.

23. The receiver of claim 21, wherein the data packets with digitized signal samples include samples of a voice signal.

24. The receiver as claimed in claim 14, wherein the expected duration of an empty buffer is given more weight than the jitter buffer delay in said cost function.

25. The receiver of claim 21, wherein the data packets with digitized signal samples include samples of a radio signal.

* * * * *